May 27, 1958  J. B. GUNN  2,836,196
HYDRAULICALLY-ACTUATED 4-WAY VALVE
Filed Aug. 25, 1955
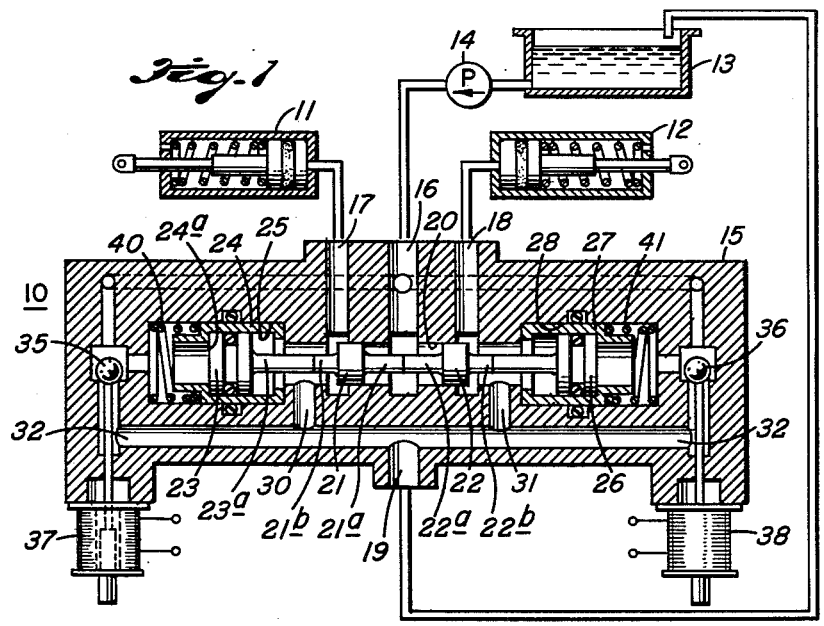
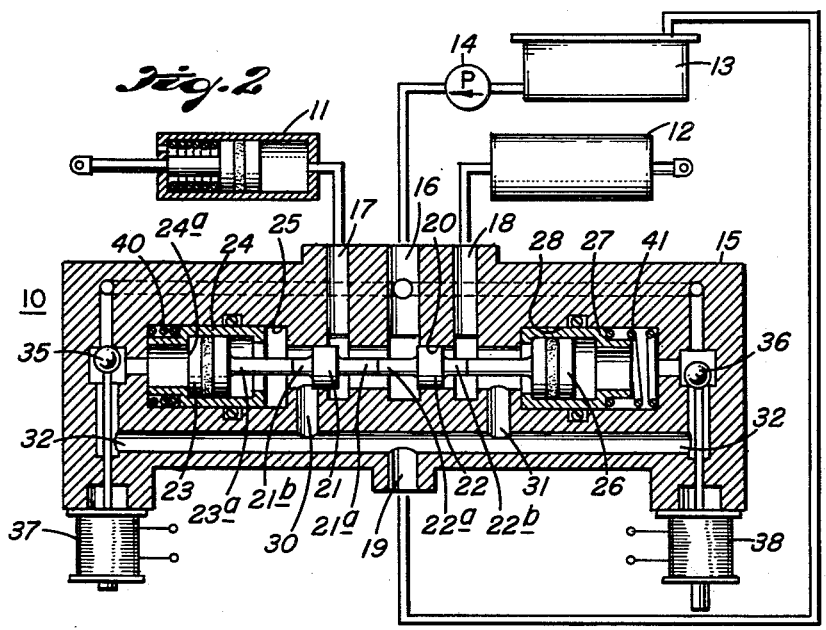
INVENTOR.
J. B. GUNN
BY
ATTORNEY United States Patent Office 2,836,196
Patented May 27, 1958

2,836,196

HYDRAULICALLY-ACTUATED 4-WAY VALVE

Joseph B. Gunn, Van Nuys, Calif., assignor to Bendix Aviation Corporation, North Hollywood, Calif., a corporation of Delaware Application August 25, 1955, Serial No. 530,489

4 Claims. (Cl. 137—622)

This invention relates to hydraulic selector valves of the shuttle type, in which a valve spool or piston is moved in either direction from a neutral position to connect one load port to a pressure port and another load port to a return port. The invention relates more particularly to valves of the aforementioned type in which the valve spool is shifted by selective application of pressure fluid to one end or the other of the spool under control of a pilot valve or valves. The usual valve of this type has only three positions; namely, a neutral or center position, a first end position in which one load port is connected to pressure and the other to return, and a second (opposite) end position in which the one load port is connected to return and the other to pressure.

An object of the invention is to provide a practicable valve of the type described having a fourth position in which both load ports are connected to pressure.

A feature of the invention is a pressure-actuated shuttle valve in which the shuttle or piston is formed in two parts, which, although normally moving together as an integral piston, are capable of separating, in response to removal of pressure from both ends, to deliver pressure fluid to both load ports simultaneously.

Other more specific objects and features of the invention will become apparent from the following description with reference to the drawing, in which:

Fig. 1 is a schematic diagram of a hydraulic system incorporating a valve in accordance with the invention, the valve being shown in neutral position.

Fig. 2 is a diagram similar to Fig. 1, but showing the valve in one extreme end position.

The hydraulic system shown in Fig. 1 comprises as its main elements a 4-way valve 10 in accordance with the invention, a first load motor 11, a second load motor 12, a fluid reservoir 13, and a pump 14.

The valve 10 comprises a body 15 having a pressure port 16 to which pressure fluid is supplied by the pump 14 from the reservoir 13; a first load port 17 connected to the load motor 11; a second load port 18 connected to the load motor 12; and a return port 19 connected to the fluid reservoir 13.

For purpose of illustration only, the load motors 11 and 12 are shown as single-acting hydraulic cylinders, the movable member or piston of each of which is moved in one direction in response to application of pressure to the motor, and is returned in the other direction when the pressure is released. However, it is to be understood that the utility of the valve 10 which constitutes the present invention is in no sense limited to the particular system shown.

The valve body 15 defines a valve cylinder 20 containing a valve piston assembly consisting of two separate pistons 21 and 22 having abutting means in the form of stems 21a and 22a projecting toward each other and in abutting relation in most positions of the valve. The piston 21 has a second stem 21b extending outwardly therefrom which abuts against the stem 23a of a motor piston 23 reciprocable within a hollow piston 24 which, in turn, is reciprocable within a cylinder 25 in the body 15. An identical structure consisting of a solid piston 26, a hollow piston 27, and a cylinder 28 is provided at the opposite end of the valve piston assembly.

The pressure port 16 intersects the cylinder 20 at the center thereof, and the load ports 17 and 18 intersect the cylinder at equidistant points on opposite sides of the pressure port 16. A return port 30 intersects the cylinder 20 at a point beyond the load port 17, and a second return port 31 intersects cylinder 20 beyond the load port 18. These return ports 30 and 31 connect to a common passage 32, which is connected to the external return port 19 previously mentioned.

The hollow piston 24 is shown in its advance position in which its movement is limited by engagement with the inner end of the cylinder 25, and the solid piston 23 is in its retracted position with respect to the hollow piston 24, in which it engages a shoulder 24a in the latter.

The outer ends of the cylinders 25 and 28 are independently connectible either to the pressure port 16 or the return port 32 by pilot valves 35 and 36, respectively, which are actuated by separate solenoids 37 and 38, respectively.

The solid piston 23 and hollow piston 24 constitute a motor piston assembly, which, with the cylinder 25, constitutes a hydraulic motor selectively energizable by movement of the pilot valve 35 into lower position to urge the associated piston 21 inwardly. The solid piston 26 and hollow piston 27 likewise constitute a piston assembly, which, with the cylinder 28, constitutes a separate hydraulic motor selectively energizable by movement of the pilot valve 36 into lower position to urge the associated valve piston 22 inwardly. Since both motor piston assemblies have the same area, they exert equal and opposite forces on the valve piston assembly when both hydraulic motors are energized by connection to the pressure port 16.

The structure described functions as follows: When both solenoids 37 and 38 are de-energized, as shown in Fig. 1, both hydraulic motors are energized by connection of the outer ends of both cylinders 25 and 28 to the pressure port 16, and the pressure urges both hollow pistons 24 and 27 into their inner limit positions, as shown, in which they engage the inner ends of the cylinders 25 and 28, respectively. However, the solid pistons 23 and 26 remain in their outermost positions with respect to their associated hollow cylinders 24 and 27, because the pressure force exerted against each solid piston is less than the sum of the pressure forces exerted against the opposite solid piston and its associated hollow piston. Therefore, the valve piston assembly consisting of the pistons 21 and 22 is in the central position shown, in which the piston 21 blocks flow from the pressure port 16 to the load port 17, and the piston 22 blocks flow from the pressure port 16 to the load port 18. In this position of the valve, with the particular design shown, the load ports 17 and 18 are not completely covered by the pistons 21 and 22, respectively, so that the load ports are connected to the return ports 30 and 31, respectively. If desired, the pistons 21 and 22 could be so proportioned as to cover the ports 17 and 18 in neutral position and block flow in either direction therethrough.

Now assuming that it is desired to deliver pressure fluid to the load port 17 to actuate the motor 11, the solenoid 37 is energized to lift the valve ball 35 away from the return port and close it against the pressure port, thereby connecting the outer end of the cylinder 25 to return. The elimination of the pressure formerly acting against the outer ends of the pistons 24 and 23 permits them to be moved as a unit to the left until the hollow piston 24 abuts against the cylinder end wall, as shown in Fig. 2. This movement is produced by the pressure acting against the outer end of the solid piston 26, which causes it to move to the inner limit of its travel with respect to the hollow piston 27. The resultant movement of the valve piston 21 disconnects the load port 17 from the return port and connects it to the pressure port 16, whereas the load port 18 is still connected to the return port past the piston 22.

If solenoid 37 is de-energized, and solenoid 38 is energized, the reverse action occurs to connect the load port 18 to the pressure port 16 and connect the load port 17 to the return port.

The three positions of operation so far described are common to all valves of this general type.

With the present invention, a fourth position of the valve is obtained by energizing both the solenoids 37 and 38 to de-energize both hydraulic motors by connecting the outer ends of both the motor cylinders 25 and 28 to return.

This permits the pressure fluid from the pressure port 16, acting upon the inner ends of the pistons 21 and 22 at all times, to separate those pistons, moving each to its outer limit position as determined by the limits of movement of the solid pistons 23 and 26 with respect to their associated hollow pistons 24 and 27, and the outer limits of the hollow pistons. This separating movement of the valve pistons 21 and 22 disconnects both the load ports 17 and 18 from the return ports and connects them to the pressure port 16 for simultaneous actuation of both the motors 11 and 12.

As shown in the drawings, springs 40 and 41 are provided in the cylinders 25 and 28, respectively, for constantly urging the hollow cylinders 24 and 27 to their innermost positions, as shown in Fig. 1. These springs supply a force much less than the hydraulic force that is available, so that they are unnecessary and perform no function under the conditions described. Their purpose is to center the valve piston assembly when no pressure is present in the pressure port 16.

Although for the purpose of explaining the invention a particular embodiment thereof has been shown and described, obvious modifications will occur to a person skilled in the art, and I do not desire to be limited to the exact details shown and described.

I claim:

1. In combination: a shuttle valve comprising a valve cylinder and a valve piston assembly therein; said cylinder having a pair of longitudinally-spaced load ports, a pressure port intermediate said load ports, and a pair of return ports on opposite sides of said respective load ports from said pressure port; said valve piston assembly comprising a pair of separate spaced-apart valve pistons having cooperating abutting means normally spacing said pistons from each other a minimum distance such that when said assembly is centrally disposed with respect to said cylinder ports, a portion at least of each valve piston is interposed between said pressure port and its associated respective load port; a pair of selectively energizable hydraulic motors coupled to said respective valve pistons for independently urging said valve pistons inwardly; means for selectively connecting said motors to said pressure port to energize them; each motor comprising a motor cylinder and a motor piston assembly therein of larger area than said valve cylinder whereby the inward force exerted by the energized motor exceeds the outward force exerted on the associated valve piston by the pressure in said pressure port; means for centering said valve piston assembly in response to equal energization of both said motors; and means limiting outward movement of each valve piston to a retracted position connecting the associated load port to said pressure port and disconnecting it from the associated return port.

2. Apparatus according to claim 1 in which said motor cylinders are positioned at opposite ends of said valve cylinder; and said motor piston assembly in each motor cylinder has a piston rod in thrust relation to the adjacent end of said valve piston.

3. Apparatus according to claim 2 in which each motor piston assembly comprises: an outer, hollow free-floating piston movable between fixed limits with respect to its associated motor cylinder; an inner solid piston positioned within said outer hollow piston and connected to said piston rod and movable between fixed limits with respect to said hollow piston, said fixed limits of said pistons being such that when both hollow pistons are fully advanced and the solid pistons are fully retracted with respect to the hollow pistons, said shuttle valve piston is centrally disposed, and when both pistons of either motor piston assembly are fully advanced, both pistons of the other motor piston assembly are fully retracted.

4. Apparatus according to claim 3 including spring means in each motor urging the hollow piston thereof to its advanced limit position.

References Cited in the file of this patent

UNITED STATES PATENTS

| | | |
|---|---|---|
| 1,945,724 | Beebe | Feb. 6, 1934 |
| 2,489,450 | Crookston | Nov. 29, 1949 |
| 2,601,990 | Holzer | July 1, 1952 |
| 2,634,086 | Johns | Apr. 7, 1953 |
| 2,702,529 | Doerfner | Feb. 22, 1955 |